United States Patent [19]

Mikielski et al.

[11] Patent Number: 6,121,376
[45] Date of Patent: Sep. 19, 2000

[54] COMPOSITIONS BASED ON PROPYLENE POLYMERS, AND THEIR USE

[75] Inventors: Raymond Mikielski, La Hulpe, Belgium; Daniel Libert, Houston, Tex.

[73] Assignee: Solvay (Societe Anonyme), Brussels, Belgium

[21] Appl. No.: 09/075,941

[22] Filed: May 12, 1998

Related U.S. Application Data

[63] Continuation of application No. 08/770,166, Dec. 19, 1996, abandoned.

[30] Foreign Application Priority Data

Dec. 21, 1995 [BE] Belgium ................................. 9501060

[51] Int. Cl.$^7$ .............................. C08L 53/00; C08L 23/13
[52] U.S. Cl. ............................. 525/88; 525/240; 525/323
[58] Field of Search ................................ 525/88, 240, 323

[56] References Cited

U.S. PATENT DOCUMENTS

| | | |
|---|---|---|
| 4,210,792 | 7/1980 | Hermans et al. . |
| 5,204,305 | 4/1993 | Fiasse et al. . |
| 5,360,868 | 11/1994 | Mosier et al. . |
| 5,412,020 | 5/1995 | Yamamoto et al. . |
| 5,543,454 | 8/1996 | Kamakura et al. . |
| 5,591,795 | 1/1997 | Nomura et al. . |
| 5,621,046 | 4/1997 | Iwanami et al. ......................... 525/240 |
| 5,852,100 | 12/1998 | Sadatoshi et al. ....................... 524/505 |
| 5,914,363 | 6/1999 | Sadatoshi et al. ....................... 524/451 |

FOREIGN PATENT DOCUMENTS

| | | |
|---|---|---|
| 78955/87 | 3/1988 | Australia . |
| 0 110 505 | 6/1984 | European Pat. Off. . |
| 0 261 727 | 3/1988 | European Pat. Off. . |
| 0 334 411 | 9/1989 | European Pat. Off. . |
| 0 636 650 | 2/1995 | European Pat. Off. . |
| 1 569 360 | 3/1972 | Germany . |
| 958 079 | 5/1964 | United Kingdom . |
| 997 249 | 7/1965 | United Kingdom . |

*Primary Examiner*—Jeffrey C. Mullis
*Attorney, Agent, or Firm*—Venable

[57] ABSTRACT

Compositions comprising a mixture of propylene polymers consisting of from 15 to 85% by weight of a propylene polymer (A) whose isotactic index is at least 0.95 and from 85 to 15% by weight of a block copolymer (B) having a fraction soluble in n-decane, measured at 23° C., of greater than 13% by weight.

15 Claims, No Drawings

COMPOSITIONS BASED ON PROPYLENE POLYMERS, AND THEIR USE

CROSS REFERENCE TO RELATED APPLICATION

This application is a continuation of our U.S. application Ser. No. 08/770,166 filed Dec. 19, 1996, now abandoned, which claims priority to Belgian Application No. 09501060 filed Dec. 21, 1995, the contents of which are incorporated herein by reference.

FIELD OF THE INVENTION

The invention relates to a composition based on propylene polymers. It also relates to the use of this composition for the manufacture of articles by injection moulding.

TECHNOLOGY REVIEW

Various articles manufactured by injection moulding, for example rigid components in the automotive industry, must combine a high flexural modulus of elasticity with good impact strength. Moreover, for problems linked with recycling, the raw materials used to manufacture these articles are becoming subject more and more to attempts to render them uniform.

Propylene polymers having a high flexural modulus of elasticity are known; however, in general their impact strength is low. Propylene copolymers having good impact strength are likewise known; however, in general their flexural modulus of elasticity is very low. Patent application EP-A-0 636 650 discloses, generically, compositions comprising from 10 to 90% by weight of a highly isotactic propylene polymer and from 90 to 10% by weight of a block propylene copolymer whose soluble fraction (at 23° C. in n-decane) is from 5 to 13% by weight and contains from 30 to 50 molar % of ethylene units. Compositions of this kind present a good compromise between flexural modulus of elasticity and impact strength. However, the compositions providing the best compromise are those where the highly isotactic polymer contains approximately 0.02 mol % of 3-methyl-1-butene. Employing such a comonomer, however, is very costly and difficult. Moreover, the compromise between flexural modulus of elasticity and impact strength leaves something to be desired.

New propylene polymer-based compositions have now been found which do not have the disadvantages described above and which make it possible to obtain manufactured articles combining a high flexural modulus of elasticity with good impact strength.

SUMMARY OF THE INVENTION

To this end the present invention provides a composition comprising a mixture of propylene polymers, consisting of:
from 15 to 85% by weight of a propylene polymer (A) whose isotactic index is at least 0.95, and
from 85 to 15% by weight of a block copolymer (B) which consists of a first block chosen from crystalline propylene polymers and of a second block chosen from propylene-ethylene copolymers, the said block copolymer (B) having a fraction soluble in n-decane, measured at 23° C., of greater than 13% by weight.

DETAILED DESCRIPTION OF THE INVENTION

The term fraction soluble in n-decane at 23° C., referred to below as soluble fraction, is intended to denote that weight fraction of the block copolymer (B) which is soluble in n-decane, measured in accordance with the method described below. This method consists in dispersing, in a stirred, round-bottomed flask, 2 g of block copolymer (B) in 500 g of n-decane which has been brought to boiling, at atmospheric pressure, in order to dissolve the copolymer (B), in then immersing the flask in a thermostatic bath at 23° C. for 0.5 hour, so as to cool the resulting solution, in filtering it over a G-4 glass frit, in recovering the solution and in drying it, firstly in a rotary evaporator and then in a vacuum oven, in order to determine the amount of block copolymer (B) which is soluble. The fraction soluble in n-decane is expressed by the percentage by weight of this soluble quantity relative to the total weight of the block copolymer (B) employed.

The propylene polymer (A) employed in the composition according to the invention preferably has an isotactic index of at least 0.96. The isotactic index of the polymer is estimated via the molar fraction of isotactic triads, in accordance with the method described below in conjunction with the examples. Propylene polymers having an isotactic index of at least 0.97 are particularly preferred. Generally, the isotactic index will not exceed 0.99, and preferably will not exceed 0.98.

The propylene polymer (A) used preferably contains only monomeric units derived from propylene.

The propylene polymer (A) preferably has a melting point of at least approximately 162° C., more particularly of at least 163° C.

The propylene polymer (A) preferably has a melt flow index, measured under a load of 2.16 kg at 230° C. in accordance with the standard ASTM D 1238, and referred to hereinafter more simply as MFI, which is at least 2 g/10 min and does not exceed 30 g/10 min. More preferably, the MFI of the propylene polymer (A) is at least 4 g/10 min and more particularly at least 5 g/10 min. The MFI preferably does not exceed 25 g/10 min, and more particularly does not exceed 15 g/10 min.

The quantity of the propylene polymer (A) in the mixture of propylene polymers is preferably at least 50% by weight. More particular preference is given to a mixture comprising at least 55% by weight of the propylene polymer (A). The mixture preferably comprises not more than 75% by weight of the propylene polymer (A). Very particular preference is given to a mixture which comprises not more than 70% by weight of the propylene polymer (A). Good results have been obtained when the quantity of propylene polymer (A) in the mixture of propylene polymers is at least 50% and does not exceed 75% by weight, relative to the weight of the mixture.

Preferably, a block copolymer (B) is employed whose soluble fraction is at least 14% and, more particularly, at least 16%, by weight. In general, this soluble fraction does not exceed 35% by weight and preferably does not exceed 30% by weight. Very particular preference is given to a copolymer (B) whose soluble fraction does not exceed 25% by weight. Good results have been obtained when the fraction soluble in n-decane of the block copolymer (B) is at least 14% and does not exceed 25% by weight.

Preferably, a block copolymer (B) is employed which has a total ethylene content of at least 5% by weight. The term total ethylene content of the block copolymer (B) is intended to denote the ethylene content measured by infrared in accordance with the method described below in connection with the examples. Good results have been obtained when the block copolymer (B) has a total ethylene content of at least 5% and not more than 30% by weight. With particular preference, a block copolymer (B) is employed which has a total ethylene content of at least 6% by weight and, more particularly, at least 7% by weight. In addition, the block copolymer (B) has an ethylene content which in general does not exceed 30% by weight and preferably does not exceed 22% by weight. Very particular preference is given to a copolymer (B) having a total ethylene content which does not exceed 12% by weight.

Preferably, a block copolymer (B) is employed whose first block consists of a propylene polymer containing only monomeric units derived from propylene.

Preferably, a block copolymer (B) is employed whose second block consists of an elastomeric copolymer of propylene and ethylene. Good results have been obtained when the ethylene content of the second block of the block copolymer (B) is at least 30% and does not exceed 70% by weight, relative to the weight of the second block.

The ethylene content of the second block is preferably at least 40% by weight, relative to the weight of the second block. The ethylene content of the second block advantageously does not exceed 60% by weight of ethylene, relative to the weight of the second block. In general, the second block represents less than 50% by weight of the total weight of the block copolymer (B). The quantity of second block is preferably not more than 45%, and more particularly not more than 40%, by weight, relative to the total weight of the block copolymer (B). In general, the second block represents at least 10%, and more particularly at least 15%, by weight, relative to the total weight of the block copolymer (B).

Block copolymers (B) which have given good results in the composition according to the invention are block copolymers whose first block is a propylene polymer containing only monomeric units derived from propylene and containing from 15 to 40% by weight of a second block chosen from propylene-ethylene copolymers comprising from 40 to 60% by weight of ethylene units.

It is preferred to employ a block copolymer (B) whose MFI is at least 2 g/10 min and does not exceed 25 g/10 min. More preferably, the MFI of the block copolymer (B) is at least 4 g/10 min and more particularly at least 5 g/10 min. More preferably, the said MFI does not exceed 20 g/10 min and more particularly does not exceed 14 g/10 min.

The propylene polymers (A) and the block copolymers (B) are well known to the skilled worker. They are preferably obtained by polymerization using catalytic systems comprising a solid based on titanium trichloride, an alkylaluminium and, optionally, an electron donor. These catalytic systems have been described, in particular, in the patent applications EP-A-0 261 727 (SOLVAY) and EP-A-0 334 411 (SOLVAY) and in the patents U.S. Pat. No. 5,204,305 (SOLVAY) and U.S. Pat. No. 4,210,729 (SOLVAY).

The block copolymers (B) which have given very good results are those obtained by block polymerization of propylene and a propylene-ethylene mixture using a catalytic system comprising a catalytic solid based on complexed titanium trichloride of crystalline form δ obtained by subjecting the solid resulting from the reduction of titanium tetrachloride by an organoaluminium reducing agent, such as diethylaluminium chloride, to successive or combined treatments by an electron donor compound, such as diisoamyl ether, and by a halogenated compound, such as titanium tetrachloride. The above-described catalytic solid has been described in the patent U.S. Pat. No. 4,210,729. The catalytic solid based on complexed titanium trichloride, as described above, has preferably also undergone prepolymerization by means of propylene and a step of activation by an activating agent from the class of organoaluminium compounds, such as diethylaluminium chloride. The block copolymers (B) which have given the best results are those obtained by block polymerization of propylene and a propylene-ethylene mixture by means of the catalytic solid described above in suspension in an inert hydrocarbon diluent, such as hexane, butane, pentane or heptane.

Mixtures of propylene polymers which have given good results are those whose total ethylene content is at least 2% by weight, relative to the total weight of the mixture of propylene polymers. This ethylene content of the mixture is preferably at least 2.5%, and more particularly at least 3%, by weight. The total ethylene content of the mixture of propylene polymers generally does not exceed 10% by weight. This ethylene content preferably does not exceed 8%, and more particularly does not exceed 6%, by weight. Good results have been obtained when the mixture of propylene polymers has a total ethylene content which is at least 2% and does not exceed 10% by weight.

The compositions according to the invention advantageously contain at least 50% by weight of the mixture of propylene polymers consisting of the propylene polymer (A) and of the block copolymer (B), relative to the total weight of the composition. According to a preferred variant of the composition according to the invention, the composition contains at least 90% by weight of the mixture of propylene polymers consisting of the propylene polymer (A) and of the block copolymer (B), relative to the total weight of the composition. Particular preference is given to a composition which contains at least 95% by weight of the mixture of propylene polymers. Very particular preference is given to a composition containing at least 97% by weight of the mixture of propylene polymers.

In addition to the mixture of propylene polymers, the composition according to the invention may also contain additives. The composition may in particular contain customary fillers, such as, for example, talc, carbon black and precipitated calcium carbonate. In this case the content of fillers in the composition generally does not exceed 50% by weight, relative to the total weight of the composition. The composition according to the invention may contain the ingredients which are customarily present in compositions based on propylene polymer, such as stabilizers, pigments, anti-acidic agents and nucleating agents. The quantity of these ingredients generally does not exceed 5% by weight, and preferably does not exceed 3% by weight, relative to the total weight of the composition.

Compositions which have given very good results are those containing at least 95% by weight of the mixture of propylene polymers, the said mixture consisting of from 55 to 70% by weight of a propylene polymer (A) containing only monomeric units derived from propylene and from 45 to 30% by weight of a copolymer (B) whose first block is a propylene polymer containing only monomeric units derived from propylene, and which contains from 15 to 40% by weight of a second block chosen from propylene-ethylene copolymers comprising from 40 to 60% by weight of ethylene units.

The composition according to the present invention can be obtained by chemical or mechanical mixing of the propylene polymer (A) and the block copolymer (B) and any additives, by means of any known and appropriate technique. The composition is usually obtained by mixing the propylene polymer (A) and the block copolymer (B) in the melted state. Generally, mixing is carried out at a temperature which does not exceed 300° C., and preferably not 280° C. The minimum temperature at which melt mixing is carried out is generally greater than 180° C., preferably greater than 200° C. Mixing can be carried out in any apparatus known for this purpose. Mixing is preferably carried out in an extruder-type mixer. The mixing of propylene polymers consisting of the propylene polymer (A) and of the block copolymer (B) can also be accomplished by polymerization of the various monomers in a plurality of successive steps in the presence of Ziegler-Natta catalysts. According to one variant, the polymer (A) is obtained in the first polymerization step whereas the copolymer (B) is obtained subsequently, in the presence of the polymer (A).

The composition according to the invention is particularly suitable for being employed in injection moulding. In this case, it is advantageous for the mixture of propylene polymers to have a MFI of from 2 to 80 g/10 min. More preferably, the MFI of the mixture is at least 3 g/10 min, and more particularly at least 7 g/10 min. Preferably the MFI does not exceed 65 g/10 min, and more particularly does not exceed 35 g/10 min. The best results have been obtained with a mixture of propylene polymers having a MFI of from 10 to 65 g/10 min. In general, it is possible to adjust the MFI of the mixture by adjusting the respective quantities and the MFIs of the propylene polymer (A) and of the block copolymer (B). It is likewise possible to adjust the MFI of the mixture by any method known in the prior art, especially by carrying out a depolymerization treatment using peroxides.

The composition according to the present invention makes it possible to obtain manufactured products combining a high flexural modulus of elasticity and good impact strength within a wide range of values of the modulus of elasticity.

The present invention likewise provides for the use of a composition based on propylene polymers, according to the invention, for the manufacture of articles by injection moulding, such as, for example, automotive components.

EXAMPLES

The examples which follow serve to illustrate the invention.

In these examples, the composition according to the invention is obtained with the aid of a twin-corotating-screw extruder of model WERNER & PFLEIDERER ZSK 58. The temperature of the feed zone is 220° C. and the temperature of the mixing zone is 260° C.

The signification of the symbols used in these examples, the units expressing the parameters mentioned, and the methods of measuring these parameters are set out below. Isotactic index=molar fraction of isotactic triads (linked sequence of three monomeric units of propylene in meso configuration) in the overall propylene polymer. This value is determined by $^{13}C$ nuclear magnetic resonance as described in Macromolecules, Volume 6, No. 6 (1973) pages 925–926 and in the references (3) to (9) of this publication.

The ethylene content is measured by infrared spectrometry and is defined as being the sum of the relative ethylene contents which are evaluated by the absorbance of the characteristic bands at 720 $cm^{-1}$ and at 740 $cm^{-1}$. Flex. mod.=the flexural modulus of elasticity measured at 23° C. on a 4 mm thick injection-moulded sample in accordance with the standard ISO 178.

IZOD=IZOD strength, impact strength measured on a notched sample at 23° C. in accordance with standard ISO 180/1A.

T. brit=brittleness temperature (brittle point) measured in accordance with the standard ASTM D 746 DDT=biaxial impact strength (dart drop test) measured in accordance with the standard DIN 53443/part 1.

Example 1

The extruder was supplied with a composition containing:

60 kg of a propylene homopolymer (A) having an isotactic index of 0.97 and a melting point of 163° C. Its MFI is 9.2 g/10 min.

40 kg of a block propylene copolymer (B) comprising 80% by weight of a first block consisting of a propylene homopolymer and 20% by weight of a second block of an elastomeric ethylene-propylene copolymer comprising 45% by weight of ethylene. This block propylene copolymer was obtained by continuous polymerization in hexane using a catalytic system comprising diethylaluminium chloride and a catalytic solid based on complexed titanium trichloride of crystalline form δ, prepolymerized with propylene and preactivated using diethylaluminium chloride. This copolymer has a MFI of 5.7 g/10 min. This copolymer has a fraction soluble in n-decane of 22% by weight. The fraction soluble in n-decane contains 49 molar % of ethylene (value measured by $^{13}C$ NMR) and has an intrinsic viscosity, measured in decahydronaphthalene at 135° C., of 1.73 dl/g.

150 g of the stabilizer IRGANOX® B 215.

60 g of hydrotalcite DHT4-A.

100 g of sodium benzoate.

6 g of 2,5-dimethyl-2,5-di-tert-butylperoxyhexane.

Table I collates the mechanical characteristics of the composition thus obtained.

Example 2

The extruder was supplied with a composition containing:

65 kg of the propylene homopolymer (A) described in Example 1, 35 kg of the propylene block copolymer (B) described in Example 1, 150 g of the stabilizer IRGANOX® B 215;

60 g of hydrotalcite DHT4-A;

100 g of sodium benzoate;

24 g of 2,5-dimethyl-2,5-di-tert-butylperoxyhexane.

Table I collates the mechanical characteristics of the composition thus obtained.

Example 3R (comparison)

The extruder was supplied with a composition containing:

100 kg of the propylene homopolymer (A) described in Example 1, 150 g of the stabilizer IRGANOX® B 215;

60 g of hydrotalcite DHT4-A;

100 g of sodium benzoate.

Table I collates the mechanical characteristics of the composition thus obtained.

Example 4R (comparison)

The extruder was supplied with a composition containing:

100 kg of the propylene block copolymer (B) described in Example 1, 150 g of the stabilizer IRGANOX® B 215;

60 g of hydrotalcite DHT4-A;

100 g of sodium benzoate;

9 g of 2,5-dimethyl-2,5-di-tert-butylperoxyhexane.

Table I collates the mechanical characteristics of the composition thus obtained.

TABLE I

|  |  | Ex. 1 | Ex. 2 | Ex. 3R | Ex. 4R |
|---|---|---|---|---|---|
| MFI | g/10 min | 18.1 | 32 | 9.2 | 11.9 |
| Flex. Mod. | MPa | 1952 | 1959 | 2312 | 1217 |
| IZOD | kJ/m2 | 4.2 | 3.44 | 2.47 | >12 |
| T. brit | °C. | 12 | 15 | >23 | −31 |
| DDT at 0° C. | J | 17 | 4.2 | <2.5 | >80 |
| DDT at 23° C. | J | 22 | 8.3 | <2.5 | >80 |

The results shown in Table I indicate that the compositions according to the invention of Examples 1 and 2 combine good impact strength (IZOD) and a high flexural modulus of elasticity.

Example 5

The extruder was supplied with a composition containing:

60 kg of a propylene homopolymer (A) as described in Example 1.

40 kg of a propylene block copolymer (B') obtained by continuous polymerization in hexane using a catalytic system comprising diethylaluminium chloride and a catalytic solid based on complexed titanium trichloride of crystalline form δ, prepolymerized with propylene and preactivated using diethylaluminium chloride. This block copolymer comprises 9% by weight of ethylene, has a MFI of 7.3 g/10 min and has a fraction soluble in n-decane of 18% by weight.

150 g of the stabilizer IRGANOX® B 215;

60 g of hydrotalcite DHT4-A;

100 g of sodium benzoate.

Table II collates the mechanical characteristics of the composition thus obtained.

Example 6

The extruder was supplied with a composition as described in Example 5 except that the copolymer (B') was replaced by a block copolymer (B") obtained by continuous gas-phase polymerization using $TiCl_4$ supported on $MgCl_2$ (catalyst SHAC 201 sold by the company PECTEN) in the presence of triethylaluminium and a silane. The propylene block copolymer (B") comprises 9% by weight of ethylene, has a MFI of 7 g/10 min and has a fraction soluble in n-decane of 18% by weight.

Table II collates the mechanical characteristics of the composition thus obtained.

TABLE II

|  |  | Ex. 5 | Ex. 6 |
|---|---|---|---|
| MFI | g/10 min | 7.9 | 8.4 |
| Flex. Mod. | MPa | 1759 | 1681 |
| IZOD | kJ/m$^2$ | 5.2 | 4 |
| DDT at 0° C. | J | 13 | 21 |
| DDT at 23° C. | J | 26 | 28 |

The results shown in Table II indicate that the composition of Example 5, comprising a block copolymer (B'), has a higher flexural modulus of elasticity than the composition of Example 6.

What is claimed is:

1. A composition comprising a mixture of propylene polymers, consisting of from 15 to 85% by weight of a propylene polymer (A) whose isotactic index is at least 0.95 and which contains only monomeric units derived from propylene, and from 85 to 15% by weight of a block copolymer (B) which consists of a first block of from 55 to 85% by weight relative to the total weight of block copolymer (B) chosen from crystalline propylene polymers and of a second block of from 45 to 15% by weight relative to the total weight of block copolymer (B) chosen from propylene-ethylene copolymers including from 30% to 70% by weight relative to the weight of the second block of ethylene, the said block copolymer (B) having a fraction soluble in n-decane, measured at 23° C., of at least 16% by weight.

2. The composition according to claim 1, wherein that the propylene polymer (A) has an isotactic index of at least 0.96.

3. The composition according to claim 1, wherein the propylene polymer (A) has a melting point of at least approximately 163° C.

4. The composition according to claim 1, wherein the quantity of propylene polymer (A) in the mixture of propylene polymers is at least 50% and does not exceed 75% by weight, relative to the weight of the mixture.

5. The composition according to claim 1, wherein the fraction soluble in n-decane of the block copolymer (B) does not exceed 25% by weight.

6. The composition according to claim 1, wherein the block copolymer (B) has a total ethylene content which is at least 5% and does not exceed 30% by weight.

7. The composition according to claim 1, wherein the first block of the block copolymer (B) contains only monomeric units derived from propylene.

8. The composition according to claim 1, wherein the second block represents from 15% to 40% by weight of the total weight of the block copolymer (B).

9. The composition according to claim 1, wherein the mixture of propylene polymers has a total ethylene content which is at least 2% and does not exceed 10% by weight.

10. The composition according to claim 1, wherein the mixture of propylene polymers has a melt flow index, measured under a load of 2.16 kg at 230° C., of from 10 to 65 g/10 min.

11. The composition according to claim 1, consisting of at least 90% by weight of the mixture of propylene polymers.

12. The composition according to claim 11, consisting of at least 95% by weight of the mixture of propylene polymers, the said mixture consisting of from 55 to 70% by weight of a propylene polymer (A) containing only monomeric units derived from propylene and from 45 to 30% by weight of a copolymer (B) whose first block is a propylene polymer containing only monomeric units derived from propylene, and which contains from 15 to 40% by weight of a second block chosen from propylene-ethylene copolymers comprising from 40 to 60% by weight of ethylene units.

13. In a method for the manufacture of articles by injection moulding, the improvement comprising moulding a composition according to claim 1.

14. A composition comprising a mixture of propylene polymers, consisting of from 15 to 85% by weight of a propylene polymer (A) whose isotactic index is at least 0.96, which has a melting point of at least approximately 163° C., and which contains only monomeric units derived from propylene, and from 85 to 15% by weight of a block copolymer (B) which consists of a first block of from 55 to 85% by weight relative to the total weight of block copolymer (B) chosen from crystalline propylene polymers which contain only monomeric units derived from propylene and of a second block of from 45 to 15% by weight relative to the total weight of block copolymer (B) chosen from propylene-ethylene copolymers including from 30% to 70% by weight relative to the weight of the second block of ethylene, the said block copolymer (B) having a fraction soluble in n-decane, measured at 23° C., of at least 16% and not more than 25% by weight, said mixture of propylene having a melt flow index, measured under a load of 2.16 kg at 230° C., of from 10 to 65 g/10 min.

15. In a method for the manufacture of articles by injection moulding, the improvement comprising moulding a composition according to claim 14.

* * * * *